Nov. 28, 1950 A. W. ZIEGLER 2,531,660

FABRICATION OF PIEZOELECTRIC CRYSTAL UNITS

Filed Aug. 27, 1949

INVENTOR
A. W. ZIEGLER
BY
[signature]
ATTORNEY

Patented Nov. 28, 1950 2,531,660

UNITED STATES PATENT OFFICE 2,531,660

FABRICATION OF PIEZOELECTRIC CRYSTAL UNITS

Arthur W. Ziegler, Short Hills, N. J., assignor to Bell Telephone Laboratories, Incorporated, New York, N. Y., a corporation of New York Application August 27, 1949, Serial No. 112,779

5 Claims. (Cl. 154—118)

This invention relates to piezoelectric crystal devices of the type having lead wires affixed to the crystal and more particularly to the fabrication of such devices.

One method of attaching the crystal lead wires, which serve both as supporting and electrical connecting means, is disclosed in my application Serial No. 68,211, filed December 30, 1948. In the method therein disclosed, a crystal blank is first etched, heated to a proper temperature, and then placed in a tool which attaches a thin disc, as of copper, to its face on the etched area. This disc is coated on one side with a thermo setting adhesive and on the other side with a solder. The tool heats the disc to make the adhesive tacky enough so that the disc sticks to the crystal plate. Another tool compresses the disc. The adhesive is then partially or completely cured so that a headed wire, the head of which is tinned with solder, can be pressed against the disc and heat applied to solder the head of the wire to the disc. The crystal face, disc, and lead wire are then plated, as with gold, in order to establish electrical connections between the crystal and the wire.

It is advantageous that the metallic plating be evenly and continuously placed between the crystal and the leads. However, difficulty often is encountered in obtaining this continual deposition of the metal. Specifically, after the disc is attached and compression only is used to cause a spreading of the adhesive under the disc, the adhesive between the crystal and the disc frequently bulges in undesirable ways leaving pockets between the edges of the adhesive and the crystal when the adhesive springs back. This bulging or overhanging of the adhesive layer prevents the depositing of a continuous and electrical conducting layer of vaporized metal between the electrode and the wire.

An object of this invention is to provide an improved crystal element in which a conducting layer of vaporized metal is evenly deposited and forms a continuous electrical connection between the crystal and the lead-in wire.

In accordance with one feature of this invention in the fabrication of the connection there is produced relative circular displacement between the thin disc and the crystal plate, which causes the adhesive to spread over a wider area of the crystal plate and assume a frusto-conical surface.

In one specific embodiment of this invention, a thin copper disc is displaced in a circular path about an eccentric center while pressure is applied, thereby spreading the adhesive on the bottom of the disc over a wider area of the crystal surface. At the time of disengaging the eccentric center, should the disc be displaced from its initial position, an adhesive "memory effect" substantially restores its position, while leaving the adhesive clinging over the wider area. The disc itself, does not undergo any substantial angular displacement as a result of this rotary displacing action. Further neither the disc nor the crystal is given any angular displacement about its own axis during this relative circular displacement so that there is no tendency for the adhesive to be wound or pulled out of proper position.

A complete understanding of the method contemplated by this invention and one illustrative means for its accomplishment may be gained from consideration of the following detailed description and accompanying drawings in which.

Figure 1:
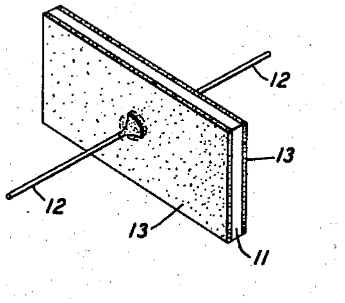
Fig. 1 is a perspective view of a crystal equipped with lead-in wires and with vaporized metal coatings extending over major flat surfaces of the crystal and over a portion of the plates on the crystal.
Figures 3, 4, 5:
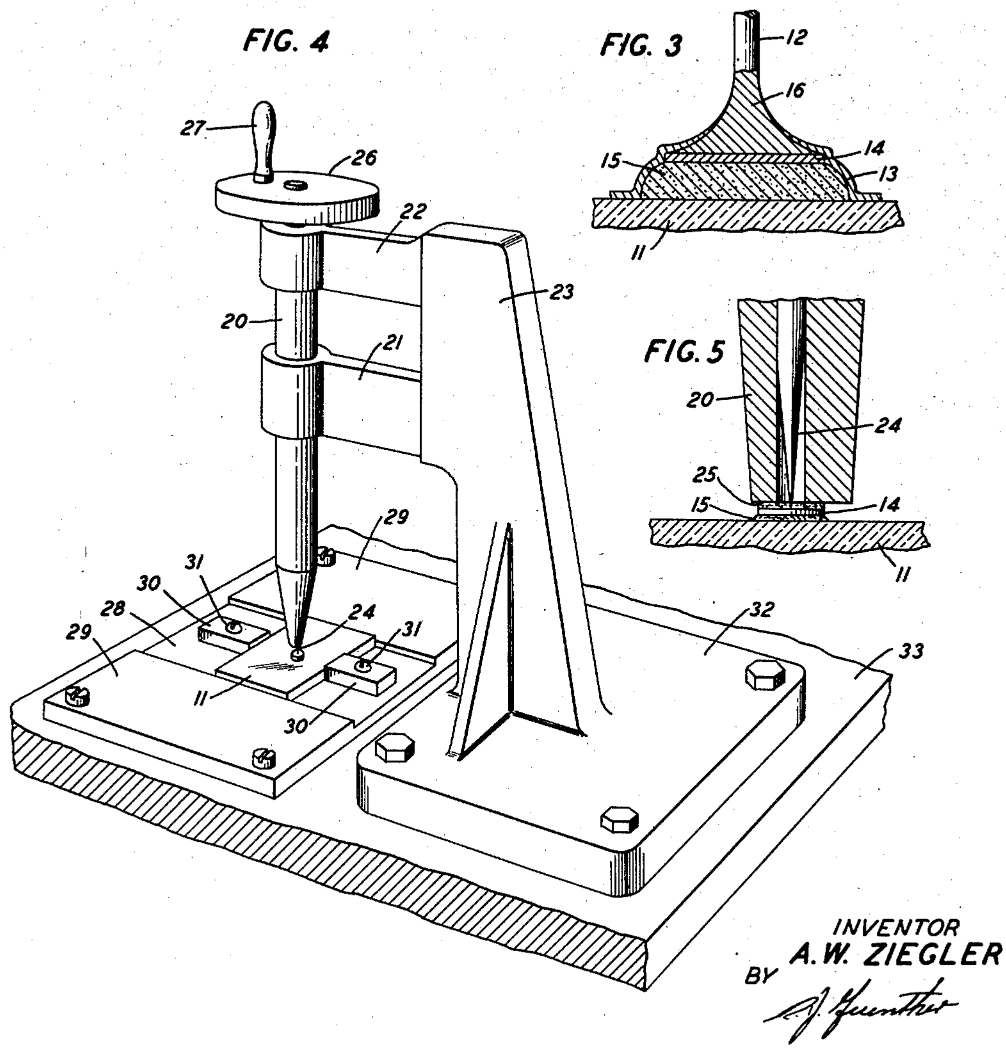
Fig. 3 illustrates the desired configuration of the adhesive achieved through the method of this invention.
Fig. 4 is a perspective view of one tool that may be employed to practice this method.
Fig. 5 is an enlarged sectional view of the shaft of the tool of Fig. 4, showing particularly the eccentric needle located therein.

Referring now to the drawing, Fig. 1 shows a completed crystal element comprising the crystal 11 equipped with headed lead wires 12 and a metal coating 13, such as vaporized gold, applied to each major flat surface of the crystal 11 to serve as electrodes for the crystal. The electrodes 12 are secured to the crystal 11, as seen in Fig. 3 and described in my aforementioned application, by a metallic plate or disc 14, such as of copper, and an adhesive layer 15. I have found that an adhesive material having elongation properties in the final cured state is desirable so that the crystal 11, which may be of ethylene diamine tartrate, will not be injured by relative expansion and contraction movements when the crystal and the parts thereto are subjected to varying temperatures, as when the head 16 of wire 12 is secured, as by soldering, to the metal disc 14, or through changes in ambient temperatures. One material I have used is an adhesive of Durez-Hycar which is a phenolic-rubber cement and which has elongation properties in the cured state.

Figure 2:
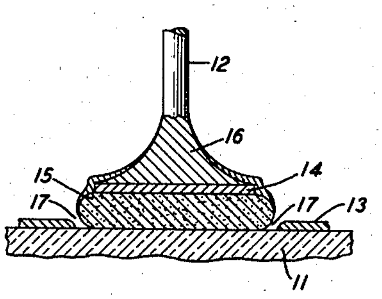
Fig. 2 illustrates the problem created through the use of prior art methods.

Priorly the disc 14, which preferably is coated on one side with the adhesive layer 15 and on the other with solder, was attached to the crystal 11 merely by placing the heated disc on the heated crystal and only compressing the disc. This compression frequently caused the adhesive layer to bulge out assuming a shape as shown in Fig. 2. It thus occurred that when the metallic layer 13, such as gold, was deposited, the metal was not evenly deposited leaving a pocket 17 between the adhesive and the crystal where no metal was deposited. Such a pocket or cavity 17 interrupted the electrical continuity required between the plated crystal surface and the lead wire 12 which is later soldered to the disc, causing the crystal to be open-circuited and non-operative.

By the method of this invention, discontinuity of the coating is prevented. Specifically this is accomplished by spreading out the adhesive 15 to secure such an enlarged area of contact with the crystal plate 11 as to generate a well defined sloping adhesive surface on which the deposition of vaporized metal can readily be built up, as shown in Fig. 3. The metallic disc 14 is attached to the heated crystal plate 11 by heating the adhesive layer 15 to make it tacky and at the same time to prevent thermal shock to the crystal plate. A relative rotational motion then is produced between the heated crystal plate and the metallic disc, while applying pressure, whereby the adhesive layer is spread over a wider area of the crystal plate. Upon release of the pressure after this relative displacement, an adhesive "memory effect" restores the disc to its initial position while leaving the adhesive covering the wider area.

One method of obtaining this relative rotational displacement between the crystal plate and the metallic disc is to rotate the disc about an eccentric center while applying pressure. This may be accomplished by various tools, one of which, for purposes of illustration, is shown in Fig. 4. As shown there, the tool comprises a rotatable and longitudinally movable shaft 20 journaled in arms 21 and 22 extending from a stand 23. Extending downwardly from the lower and polished end of the shaft 20 is a small needle 24 operable, as shown in Fig. 5, to stick into the solder coating 25 of the disc 14 when the disc is placed with its adhesive coating 15 in engagement with the surface of crystal 11. When the point of the needle 24 is in engagement with the solder 25 on the disc 14 and the shaft 20 is rotated, the disc 14 will be moved in an orbital path over a small portion of the surface of the crystal 11 to spread the adhesive over a larger area on the crystal surface than the area of the lower surface of the disc 14. The weight of the shaft 20 and its attached wheel 26 and handle 27 provides a required pressure for pressing the disc 14 against the crystal 11 during this eccentric rotation. The eccentricity of the needle 24 in the shaft 20 which provides the spreading of the adhesive is clearly shown in the enlarged sectional view of Fig. 5. Further, as already shown there, the tapered end of the shaft 20 is polished to rest flatly on the flat solder layer 25 on the disc 14. By thus applying pressure evenly over the whole surface of the disc, no tilting or wobbling of the disc as it is moved is possible, which would cause the disc to become non-parallel with the crystal plate 11 and prevent the desired spread of the adhesive.

The crystal 11 during this operation is firmly held on a plate 28 by raised parallel portions 29 of the plate 28 and blocks 30, the blocks being secured to the plate 28 by screws 31 for easy removal of the crystal 11. Both the plate 28 and the base 32 of the stand 23 may be secured to a bed or base plate 33, as shown in Fig. 4.

After the disc 14 has been pressed against the crystal 11 and rotated eccentrically to spread the adhesive over a larger area on the crystal, the shaft 20 is lifted out of engagement with the disc 14. The memory effect in the adhesive will then cause the disc 14 to move from any off-center position in which it was left by the needle 24 to the central portion of the area of the larger spread of adhesive and there will then be, in effect, a frusto-conoidal adhesive layer larger than the disc 14 and holding the disc 14 in proper position on the crystal 11. This frusto-conoidal surface provides a favorable surface angle for the metal subsequently applied to the crystal and the disc, as shown in Fig. 3, preventing the occurrence of cavities 17, such as shown in Fig. 2, and the accompanying discontinuity in the metallic layer and hence in the electrical connection between the metal electrode 13 and the crystal lead 12.

It is to be understood that the above-described arrangements are illustrative of the application of the principles of the invention. Numerous other arrangements may be devised by those skilled in the art without departing from the spirit and scope of the invention.

What is claimed is:

1. In the method of equipping a crystal with a lead wire, the step comprising securing a disc to the crystal by an adhesive and imparting relative motion between the disc and the crystal to spread the adhesive over a wider area of the crystal.

2. In the method of equipping a crystal with an electrical conducting lead wire, the step comprising securing a plate by adhesive to the crystal and rotating the center of said plate in a circle while simultaneously applying pressure to said plate.

3. The method of equipping a crystal with an electrical conducting lead wire comprising securing a metal disc to a crystal unit by an interposed layer of adhesive of equal area with said disc, and causing relative motion between said unit and said disc in a small circle while applying pressure between said unit and said disc, whereby said adhesive is spread over a large area of said unit.

4. The method of securing a metal plate to a crystal unit preparatory to securing an electrical conducting lead wire to said plate comprising securing a metal plate to said unit by an interposed adhesive layer, and causing rotational motion between said plate and said unit about an eccentric axis while applying pressure between said plate and said unit.

5. The method of equipping a crystal with an electrical conducting lead wire comprising securing a disc to said crystal, said disc comprising an adhesive layer, a metal plate and a layer of solder on top of said plate, piercing said solder layer with a needle and rotating said needle in a small circle while applying pressure to said disc whereby said adhesive is spread over an area of said crystal.

ARTHUR W. ZIEGLER.

REFERENCES CITED

The following references are of record in the file of this patent:

UNITED STATES PATENTS

| Number | Name | Date |
|---|---|---|
| 2,397,744 | Kertesz | Apr. 2, 1946 |